(12) United States Patent
Stutika et al.

(10) Patent No.: US 11,458,865 B2
(45) Date of Patent: Oct. 4, 2022

(54) SEAT TRACK MECHANISM

(71) Applicant: LEAR CORPORATION, Southfield, MI (US)

(72) Inventors: Peter Stutika, Presov (SK); Slavomir Basarik, Presov (SK); Michael Wojatzki, Ennigerloh (DE); Alfred Cziomer, Rietberg (DE); Marian Tkac, Presov (SK); Marian Podhorsky, Presov (SK); Pavol Plocar, Presov (SK); Miroslav Dedina, Presov (SK); Ondrej Prokop, Presov (SK); Peter Alberty, Presov (SK)

(73) Assignee: Lear Corporation, Southfield, MI (US)

( * ) Notice: Subject to any disclaimer, the term of this patent is extended or adjusted under 35 U.S.C. 154(b) by 49 days.

(21) Appl. No.: 16/929,735

(22) Filed: Jul. 15, 2020

(65) Prior Publication Data

US 2021/0107382 A1    Apr. 15, 2021

(30) Foreign Application Priority Data

Oct. 11, 2019    (DE) .................. 10 2019 215 628.2

(51) Int. Cl.
*B60N 2/07* (2006.01)
*B60N 2/08* (2006.01)

(52) U.S. Cl.
CPC .......... *B60N 2/0806* (2013.01); *B60N 2/0715* (2013.01); *B60N 2/0875* (2013.01); *B60N 2/072* (2013.01)

(58) Field of Classification Search
CPC ........ B60N 2/12; B60N 2/123; B60N 2/0818; B60N 2/20
See application file for complete search history.

(56) References Cited

U.S. PATENT DOCUMENTS

| | | | |
|---|---|---|---|
| 4,639,038 A * | 1/1987 | Heling | B60N 2/123 297/341 |
| 5,899,532 A * | 5/1999 | Paisley | B60N 2/123 297/341 |
| 5,941,494 A | 8/1999 | Garrido | |
| 6,767,063 B1 * | 7/2004 | Abdella | B60N 2/085 297/378.12 |
| 7,918,507 B2 * | 4/2011 | Schmale | B60N 2/20 297/341 |
| 8,517,328 B2 | 8/2013 | Wieclawski et al. | |

(Continued)

FOREIGN PATENT DOCUMENTS

| CN | 1513695 A | 7/2004 |
|---|---|---|
| CN | 104590060 A | 5/2015 |

(Continued)

OTHER PUBLICATIONS

German Office Action dated Sep. 10, 2020 for related German Patent Appln. No. DE 102019215628.2; 10 pages.

(Continued)

*Primary Examiner* — Sarah B McPartlin
(74) *Attorney, Agent, or Firm* — Brooks Kushman PC

(57) ABSTRACT

A seat track mechanism for a vehicle seat. The seat track mechanism may include an upper track, a lower track, a striker, a lever, and a pawl. The lever may be rotatable about a lever axis. The pawl may be rotatable with respect to the lever about a pawl axis when the striker engages the pawl.

20 Claims, 10 Drawing Sheets

(56) References Cited

U.S. PATENT DOCUMENTS

| | | |
|---|---|---|
| 9,340,125 B2 | 5/2016 | Stutika et al. |
| 9,776,532 B2 | 10/2017 | Stutika et al. |
| 2009/0033138 A1 | 2/2009 | Yamada et al. |

FOREIGN PATENT DOCUMENTS

| | | |
|---|---|---|
| CN | 105189194 A | 12/2015 |
| DE | 102009033892 A1 | 2/2011 |
| JP | 2012233318 A | 11/2012 |

OTHER PUBLICATIONS

Chinese Office Action dated Jun. 20, 2022 for related Chinese Patent Appln. No. 202010941532.0; 16 pages.

\* cited by examiner

SEAT TRACK MECHANISM

CROSS-REFERENCE TO RELATED APPLICATION

This application claims foreign priority benefits under 35 U.S.C. § 119(a)-(d) to DE 10 2019 215 628.2, filed Oct. 11, 2019, the disclosure of which is hereby incorporated by reference in its entirety.

TECHNICAL FIELD

This disclosure relates to a seat track mechanism that facilitates positioning of a vehicle seat.

BACKGROUND

A track adjuster that may be used in connection with a vehicle seat is disclosed in U.S. Pat. No. 9,340,125.

SUMMARY

In at least one embodiment, the seat track mechanism is provided. The seat track mechanism may include a lower track, an upper track, a striker, a lever, and a pawl. The upper track may be slidable with respect to the lower track. The striker may be received in the lower track. The lever may be received in the upper track and may be rotatable about a lever axis with respect to the upper track. The pawl may be received in the upper track and may be rotatable about a pawl axis with respect to the lever. The pawl may rotate about the pawl axis when the striker engages the pawl.

In at least one embodiment, the seat track mechanism is provided. The seat track mechanism may include a lower track, an upper track, a striker, a lever, and a pawl. The upper track may be received in the lower track and may be slidable along a longitudinal axis with respect to the lower track. The striker may be fixedly disposed in the lower track. The lever may be received in the upper track and may be rotatable about a lever axis with respect to the upper track. The pawl may be received in the upper track and may be received in the lever. The pawl may be rotatable about a pawl axis with respect to the lever. The pawl may rotate about the pawl axis when the striker engages the pawl.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
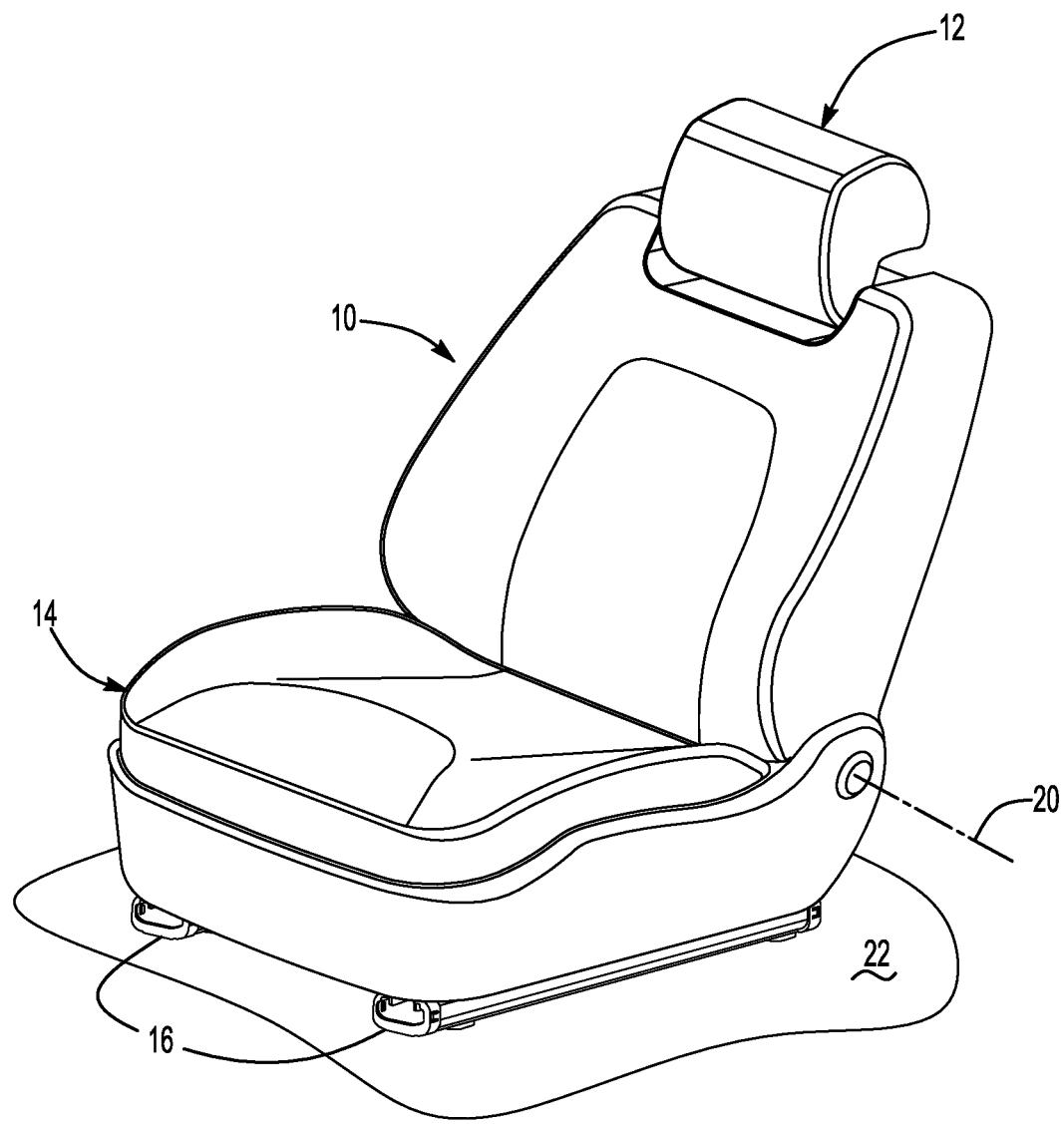
FIG. 1 is a perspective view of a seat assembly.

Referring to FIG. 1, an example of a seat assembly 10 is shown. The seat assembly 10 may be configured for use with a vehicle, such as a motor vehicle like a car or truck, aircraft, or marine vessel. The seat assembly 10 may include a seat back 12, a seat bottom 14, and a pair of seat track mechanisms 16.

The seat back 12 may be configured to support the back of a seat occupant. The seat back 12 may be pivotal about an axis 20 with respect to the seat bottom 14. For example, a pair of recliner mechanisms may pivotally connect the seat back 12 to the seat bottom 14. The recliner mechanisms may allow the seat back 12 to pivot forward and backward with respect to a generally upright design position or a seating position in which the seat assembly 10 may receive a seat occupant.

The seat bottom 14 may be configured to support a seat occupant. The seat bottom 14 may be mounted to a pair of seat track mechanisms 16, which in turn may be mounted on a support surface 22, such as a portion of a vehicle body structure like a floor pan.

Figure 2:
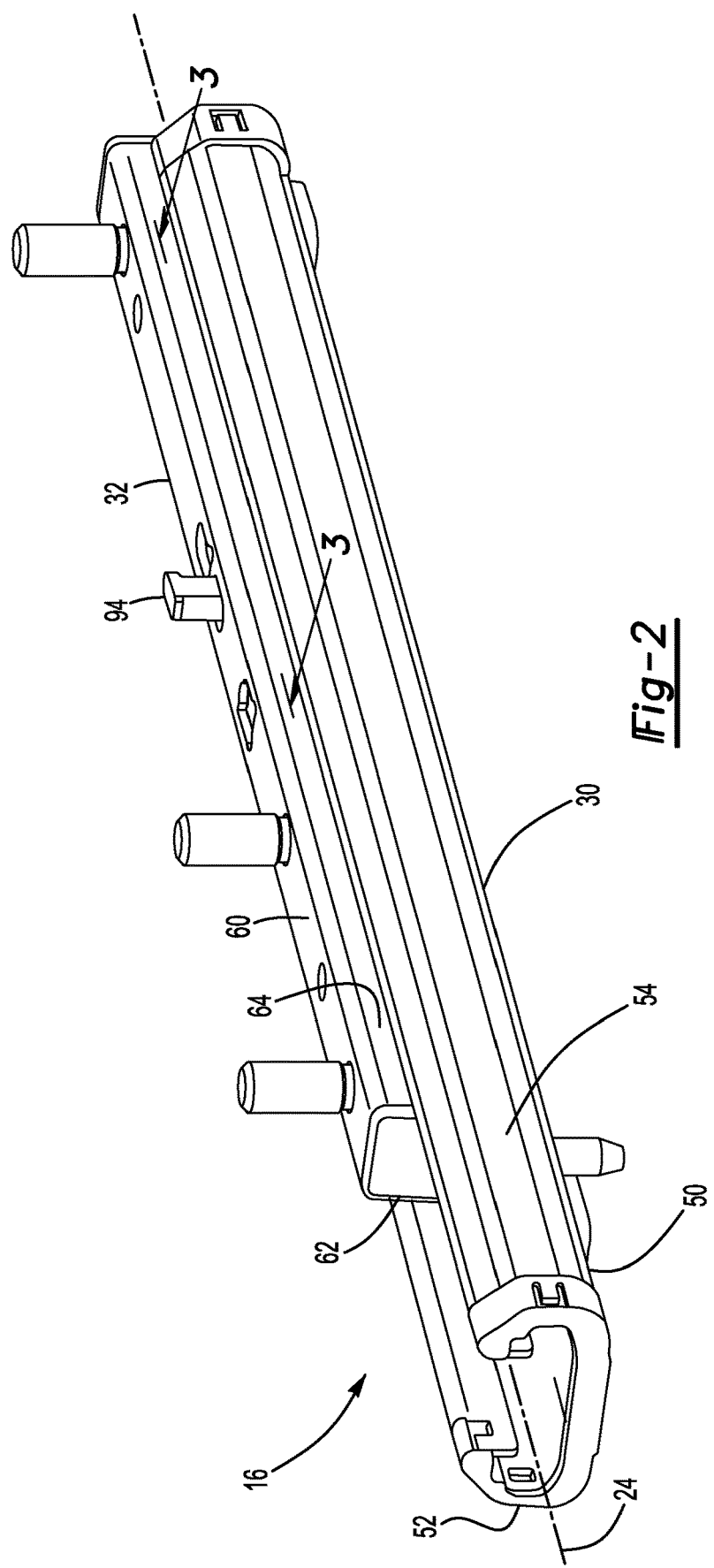
FIG. 2 is a perspective view of a seat track mechanism that may be provided with the seat assembly.

Referring to FIGS. 1 and 2, the seat track mechanism 16 may permit longitudinal movement of the seat assembly 10 in a forward/backward direction or movement along a longitudinal axis 24 with respect to the support surface 22. The longitudinal axis 24 may be disposed perpendicular to the axis 20 and may be disposed in a generally horizontal plane.

Figure 3:
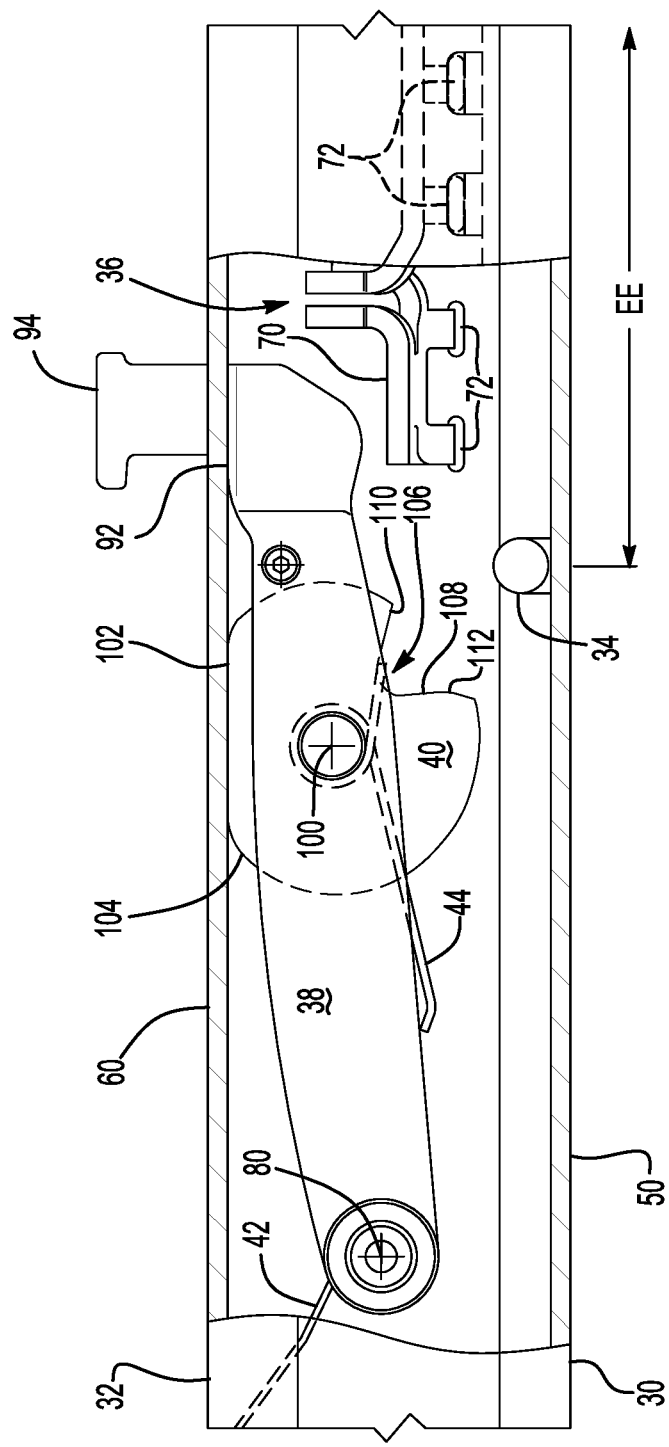
FIG. 3 is a fragmentary section view of the seat track mechanism along section line 3-3 showing a lever in a first position and a pawl in an unlocked position with respect to the lever.

Referring to FIGS. 2 and 3, an example of a seat track mechanism 16 is shown in more detail. The seat track mechanism 16 may include a lower track 30, an upper track 32, a striker 34, a track latching mechanism 36, a lever 38, a pawl 40, a lever biasing member 42, and a pawl biasing member 44.

The lower track 30 may be configured to be fixedly mounted on the support surface 22. For example, the lower track 30 may be coupled to the support surface 22 with one or more fasteners such as bolts, pins, or the like. In at least one configuration, the lower track 30 may include a bottom wall 50, a first side wall 52, and a second side wall 54.

The bottom wall 50 may be disposed proximate the support surface 22. As such, the bottom wall 50 may be disposed below the upper track 32 and may be disposed at the bottom of the lower track 30. In at least one configuration, the bottom wall 50 may be substantially planar and may extend from the first side wall 52 to the second side wall 54.

The first side wall 52 may extend from a first lateral end of the bottom wall 50. The first side wall 52 may extend in a generally upward direction and may have a distal end that may bend inward toward the longitudinal axis 24 or the center of the lower track 30 and may hook over the upper track 32. A plurality of notches may be disposed proximate or may extend from the distal end of the first side wall 52. A notch may be configured to receive a portion of the track latching mechanism 36 to inhibit movement of the upper track 32 with respect to the lower track 30 as will be discussed in more detail below.

The second side wall 54 may extend from a second lateral end of the bottom wall 50. As such, the second side wall 54 may be disposed opposite the first side wall 52. In addition, the second side wall 54 may have mirror symmetry with the first side wall 52. As such, the second side wall 54 may extend in a generally upward direction and may have a distal end that bend inward and may hook over another portion of the upper track 32. A plurality of notches may also be disposed proximate or may extend from the distal end of the second side wall 54.

The upper track 32 may be at least partially received in the lower track 30. In addition, the upper track 32 may be spaced apart from the lower track 30. The upper track 32 may be slidable with respect to the lower track 30 along the longitudinal axis 24 or in a direction that may extend parallel to the longitudinal axis 24. For instance, a plurality of bearing elements may be received in the lower track 30 and may extend from the lower track 30 to the upper track 32 to support the upper track 32 and facilitate axial movement of the upper track 32 in a manner known by those skilled in the art. In at least one configuration, the upper track 32 may include a top wall 60, a first side wall 62, and a second side wall 64.

The top wall 60 may be disposed proximate the seat bottom 14. In addition, the top wall 60 may be coupled to the seat bottom 14 and may support the seat bottom 14. The top wall 60 may be disposed above the lower track 30 and may be disposed at the top of the upper track 32. In at least one configuration, the top wall 60 may be substantially planar and may extend from the first side wall 62 to the second side wall 64.

The first side wall 62 may extend from a first lateral end of the top wall 60. The first side wall 62 may extend in a generally downward direction toward the bottom wall 50 of the lower track 30 and then subsequently bend outward and extend upward such that the distal end of the first side wall 52 of the lower track 30 may be received between the downward and upward extending portions of the first side wall 62 of the upper track 32. A plurality of notches may be provided in the first side wall 62. For example, notches may be provided in the downward and upward extending portion of the first side wall 62. A notch may be configured to receive a portion of the track latching mechanism 36 to inhibit movement of the upper track 32 with respect to the lower track 30 as will be discussed in more detail below.

The second side wall 64 may extend from a second lateral end of the top wall 60. As such, the second side wall 64 may be disposed opposite the first side wall 62. In addition, the second side wall 64 may have mirror symmetry with the first side wall 62. As such, the second side wall 64 may extend in a generally downward direction toward the bottom wall 50 and subsequently bend outward and extend upward such that the distal end of the second side wall 54 of the lower track 30 may be received between the downward and upward extending portions of the second side wall 64. The second side wall 64 may also include a plurality of notches like the first side wall 62.

Referring to FIG. 3, the striker 34 may be received in the lower track 30. For example, the striker 34 may be disposed between the first side wall 52 and the second side wall 54. The striker 34 may be integrally formed with the lower track 30 or may be provided as a separate component. In either case, the striker 34 may be fixedly positioned with respect to the lower track 30. In at least one configuration, the striker 34 may extend from the bottom wall 50 of the lower track 30 in an upward direction toward the upper track 32 and may be spaced apart from the upper track 32. The striker 34 may extend upward toward the top wall 60 and into the upper track 32 such that a portion of the striker 34 may be positioned between the first side wall 62 and the second side wall 64 of the upper track 32. The striker 34 may delineate or define a location at which easy entry travel and comfort travel meet as will be discussed in more detail below.

Figure 10:
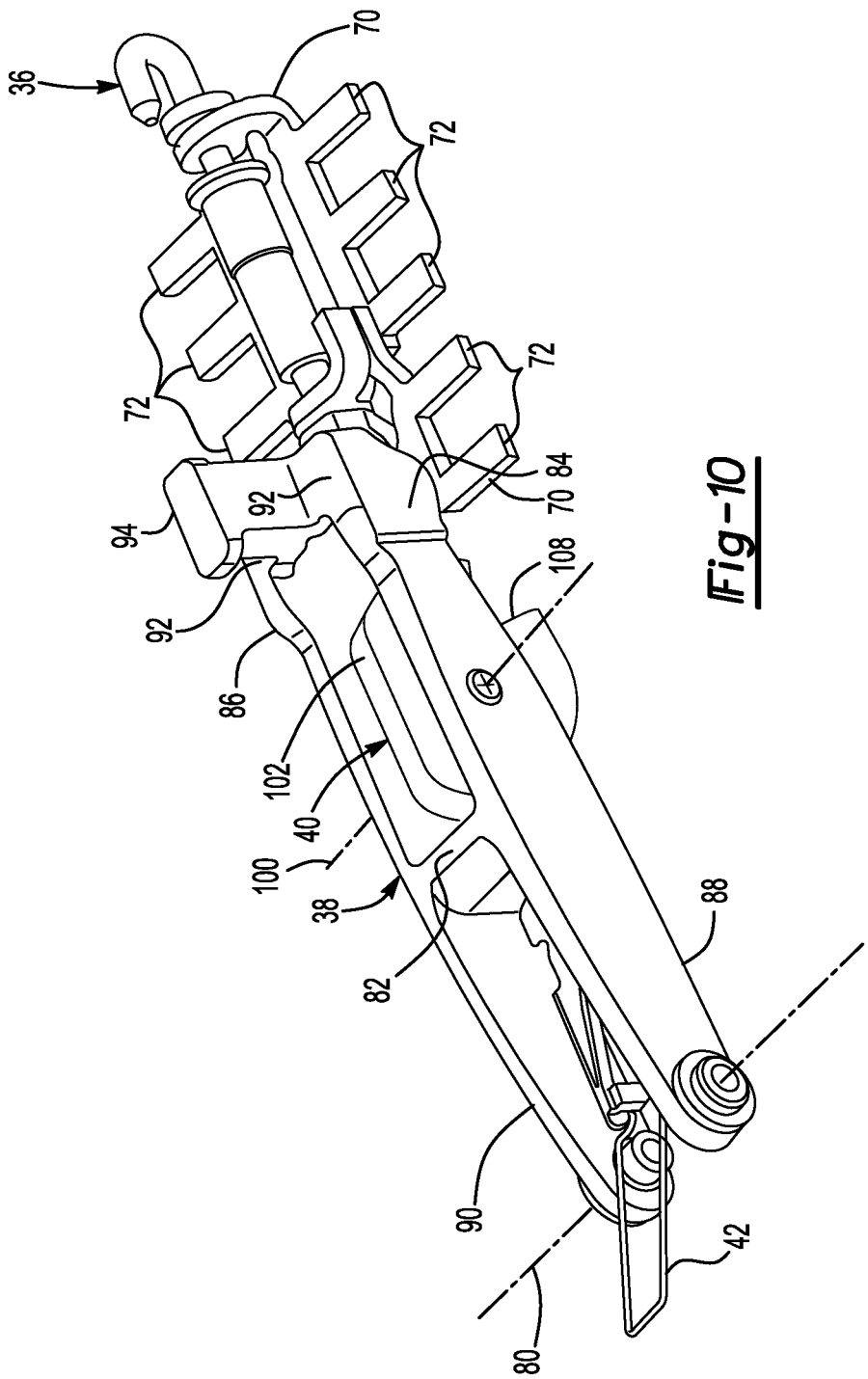
FIG. 10 is a perspective view of the lever, pawl, and a track latching mechanism of the seat track mechanism.

Referring primarily to FIGS. 3 and 10, the track latching mechanism 36 is shown. The track latching mechanism 36 may selectively couple and decouple the upper track 32 and the lower track 30. The track latching mechanism 36 may have any suitable configuration. For example, the track latching mechanism 36 may have one or more latch plates 70 that may be arranged between the lower track 30 and the upper track 32. The latch plate 70 may have one or more locking arms 72 and may be movable between a latched position and an unlatched position.

In the latched position, the latch plate 70 may engage the lower track 30 and the upper track 32 to inhibit axial movement of the upper track 32 along the longitudinal axis 24 with respect to the lower track 30. For example, a locking arm 72 may extend through at least one notch in the upper track 32 and a corresponding notch in the lower track 30 when the latch plate 70 is in the latched position. A locking arm 72 may extend in a generally horizontal direction when in the latched position. An example of such positioning is shown in FIG. 3.

Figure 4:
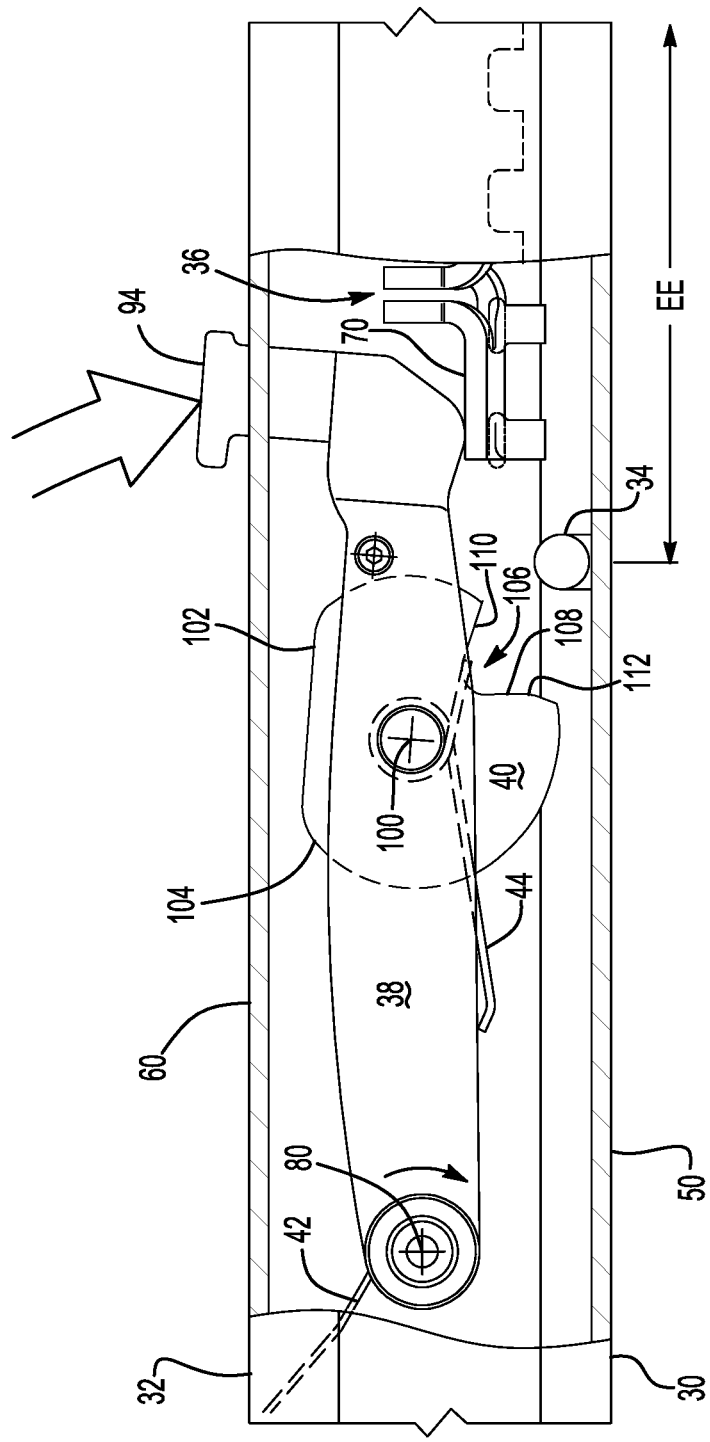
FIG. 4 is a fragmentary section view of the seat track mechanism showing the lever in a second position and the pawl in the unlocked position.

In the unlatched position, the latch plate 70 may be disengaged from the lower track 30 to permit axial movement of the upper track 32 with respect to the lower track 30. For example, the latch plate 70 may be rotated or otherwise actuated such that a locking arm 72 may not be received in a notch in the lower track 30 when the latch plate 70 is in the unlatched position. An example of such positioning is shown in FIG. 4.

Referring to FIGS. 3 and 10, the lever 38 is shown. The lever 38 may be made of any suitable material, such as a polymeric material like plastic. The lever 38 may be rotatably coupled to the upper track 32. For instance, the lever 38 may be at least partially received in the upper track 32 between the first side wall 62 and the second side wall 64 and may be rotatable about a lever axis 80 with respect to the upper track 32. In at least one configuration, the lever 38 may include a center portion 82, a first arm 84, a second arm 86, a third arm 88, a fourth arm 90, a cross wall 92, and an actuation feature 94.

The center portion 82 may be disposed proximate the middle of the lever 38. The center portion 82 may provide a structure from which arms of the lever 38 may extend.

The first arm 84 may extend from the center portion 82 toward the track latching mechanism 36. The first arm 84 may be disposed adjacent to and may extend generally parallel to the first side wall 62 of the upper track 32. The first arm 84 may be spaced apart from the second arm 86.

The second arm 86 may also extend from the center portion 82 toward the track latching mechanism 36. The second arm 86 may be disposed adjacent to and may extend generally parallel to the second side wall 64 of the upper track 32. The second arm 86 may be configured as a mirror image of the first arm 84. As such, the second arm 86 may be disposed parallel to the first arm 84.

The third arm 88 may extend from the center portion 82 in a direction that extends away from the track latching mechanism 36. The third arm 88 may be disposed opposite the first arm 84. In addition, the third arm 88 may be disposed adjacent to and may extend generally parallel to the first side wall 62 of the upper track 32. The third arm 88 may be pivotally coupled or rotatably coupled to the first side wall 62 in a manner that facilitates rotation of the lever 38 about the lever axis 80 with respect to the upper track 32.

The fourth arm 90 may also extend from the center portion 82 in a direction that extends away from the track latching mechanism 36. The fourth arm 90 may be disposed opposite the second arm 86. In addition, the fourth arm 90 may be disposed adjacent to and may extend generally parallel to the second side wall 64 of the upper track 32. The fourth arm 90 may be pivotally coupled or rotatably coupled to the second side wall 64 of the upper track 32 in a manner that facilitates rotation of the lever 38 about the lever axis 80.

The cross wall 92 may extend from the first arm 84 to the second arm 86. In at least one configuration, the cross wall 92 may be spaced apart from the center portion 82 and may be disposed at or near the ends of the first arm 84 and the second arm 86. The cross wall 92 may be disposed proximate the top or top sides of the first arm 84 and the second arm 86.

The actuation feature 94 may extend from the cross wall 92. The actuation feature 94 may extend from a top side of the cross wall 92 through a hole in the top wall 60 of the upper track 32 as is best shown in FIG. 2. The actuation feature 94 may allow force to be applied to actuate the lever 38 from outside of the upper track 32.

Referring to FIGS. 3 and 10, the pawl 40 may be disposed between the lower track 30 and the upper track 32. For example, the pawl 40 may be vertically positioned between the bottom wall 50 of the lower track 30 and the top wall 60 of the upper track 32. In addition, the pawl 40 may be laterally positioned such that the pawl 40 may be at least partially received in the upper track 32 between the first side wall 62 and the second side wall 64. The pawl 40 may also be received in the lever 38. For example, the pawl 40 may be received between the first arm 84 and the second arm 86 of the lever 38 as is best shown in FIG. 10. The pawl 40 may be rotatably disposed on the lever 38. For example, the pawl 40 may be rotatable about a pawl axis 100 with respect to the lever 38 by mounting the pawl 40 on the first arm 84, the second arm 86, or both. The pawl 40 may be rotatably mounted on the lever 38 in any suitable manner, such as with a shaft, pin, or the like. The pawl axis 100 may be disposed in a parallel or substantially parallel relationship with the lever axis 80. As best shown in FIG. 3, the pawl axis 100 may be positioned closer to the actuation feature 94 of the lever 38 than to the lever axis 80. The pawl 40 may rotate about the pawl axis 100 when the striker 34 engages the pawl 40 as will be discussed in more detail below. In at least one configuration, the pawl 40 may include a first surface 102, a cam lobe 104, and a recess 106. The recess 106 may be defined by a first recess surface 108 and a second recess surface 110.

Referring to FIG. 3, the first surface 102 may face toward the top wall 60 of the upper track 32. In at least one configuration, the first surface 102 may be substantially planar and may be disposed perpendicular to the pawl axis 100. The first surface 102 may be aligned in a substantially parallel relationship with the top wall 60 of the upper track 32 and may engage or contact the top wall 60 of the upper track 32 when the pawl 40 is in an unlocked position and the lever 38 is in a first position as will be discussed in more detail below.

The cam lobe 104 may be disposed adjacent to the first surface 102. For example, the cam lobe 104 may extend along an arc that is convex with respect to the pawl axis 100 and may be positioned between the first surface 102 and the first recess surface 108. The cam lobe 104 may contact and may be wedged against a portion of the upper track 32 when the pawl 40 is in a locked position as will be discussed in more detail below.

The recess 106 may be disposed on an opposite side of the pawl axis 100 from the cam lobe 104. The recess 106 may extend inward toward the pawl axis 100 from the perimeter of the pawl 40.

The first recess surface 108 may extend from an end of the cam lobe 104 or a perimeter of the pawl 40 in a generally inward direction toward the pawl axis 100. The first recess surface 108 may have a nonlinear configuration in which the first recess surface 108 may bend away from an apex 112.

The second recess surface 110 may extend from an end of the first recess surface 108 that is disposed closest to the pawl axis 100. The second recess surface 110 may extend at an oblique angle from the first recess surface 108. In at least one configuration, the second recess surface 110 may be generally planar and may extend at an acute angle from the first recess surface 108.

It is also contemplated that a stop may be associated with the pawl 40 to limit rotation about the pawl axis 100 with respect to the lever 38. For instance, a stop may limit rotation of the pawl 40 in a counterclockwise direction about the pawl axis 100 from the perspective shown in FIG. 3. As such, the pawl 40 may be held in a stationary position relative to the lever 38 under the biasing force of the pawl biasing member 44 when the lever 38 moves from the first position shown in FIG. 3 to a second position shown in FIG. 4 in which the first surface 102 may be disengaged from the top wall 60 of the upper track 32.

Referring to FIGS. 3 and 10, the lever biasing member 42 may exert a biasing force on the lever 38. For example, the lever biasing member 42 may urge the lever 38 to rotate about the lever axis 80 toward the top wall 60 of the upper track 32 or in a counterclockwise direction from the perspective shown in FIG. 3. In at least one configuration, the lever biasing member 42 may be coupled to the third arm 88 and the fourth arm 90 and may extend to the top wall 60.

Referring to FIG. 3, the pawl biasing member 44 may exert a biasing force on the pawl 40. For example, the pawl biasing member 44 may urge the pawl 40 to rotate about the pawl axis 100 such that the first surface 102 of the pawl 40 moves toward the top wall 60 of the upper track 32 or in a counterclockwise direction from the perspective shown in FIG. 3. As a nonlimiting example, the pawl biasing member 44 may be configured as a coil spring that may be coiled around the pawl axis 100 and may have a first end that may be coupled to the lever 38 and an opposing second end that may be coupled to the pawl 40.

Referring to FIGS. 3-9, operation of the seat track mechanism 16 will now be described in more detail.

Referring to FIG. 3, the lever 38 is shown in the first position and the pawl 40 is shown in the unlocked position. The cross wall 92 of the lever 38 may engage the top wall 60 of the upper track 32 when the lever 38 is in the first position. The lever 38 may be held in the first position by the lever biasing member 42. The lever biasing member 42 may exert a biasing force on the lever 38 that may urge the lever 38 to rotate in a counterclockwise direction about the lever axis 80 from the perspective shown. The pawl 40 may be held in the unlocked position by the pawl biasing member 44. The pawl biasing member 44 may exert a biasing force on the pawl 40 that may urge the pawl 40 to rotate in a counterclockwise direction about the pawl axis 100 from the perspective shown. As such, the first surface 102 of the pawl 40 may engage the top wall 60 of the upper track 32 when the lever 38 is in the first position and the pawl 40 is in the unlocked position. In addition, the pawl 40 may be completely disposed above the striker 34 such that striker 34 may not engage the pawl 40 when the lever 38 is in the first position. The latch plate 70 may be disposed in the latched position when the lever 38 is in the first position. As such, the upper track 32 may not be slidable along the longitudinal axis 24 with respect to the lower track 30 when the lever 38 is in the first position. The lever 38 may also be spaced apart from the latch plate 70.

Referring to FIG. 4, the lever 38 is shown in the second position and the pawl 40 is shown in the unlocked position. The lever 38 may move from the first position to the second position when sufficient force is exerted on the lever 38 to overcome the biasing force of the lever biasing member 42. For instance, the lever 38 may move from the first position to the second position when sufficient downward force is applied to the actuation feature 94, thereby causing the lever 38 to rotate about the lever axis 80 from the first position to the second position, or in a clockwise direction from the perspective shown. Force may be applied to the actuation feature 94 by an actuator that may have any suitable configuration. For instance, the actuator may be a mechanical, electromechanical, or electrical actuator. As a nonlimiting example, a release handle on the seat back 12 may be used as an actuator and may be operatively connected to the actuation feature 94 by one or more linkages, such as a cable, lever, or combinations thereof. Pulling the release handle may also unlock the recliner mechanisms and allow the seat back 12 to pivot forward with respect to the seat bottom 14 in a manner known by those skilled in the art. The lever 38 may engage the latch plate 70 when in the second position. More specifically, the lever 38 may actuate the latch plate 70 from the latched position to the unlatched position when the lever 38 moves from the first position to the second position. As a result, the upper track 32 may be slidable with respect to the lower track 30 along the longitudinal axis 24 when the lever 38 is in the second position. The pawl 40 may move downward toward the striker 34 when the lever 38 is in the second position. Accordingly, the pawl axis 100 may be disposed closer to the bottom wall 50 of the lower track 30 when the lever 38 is in the second position as compared to the first position. Moreover, the striker 34 may be engageable with the pawl 40 when the lever 38 is in the second position.

Figure 5:
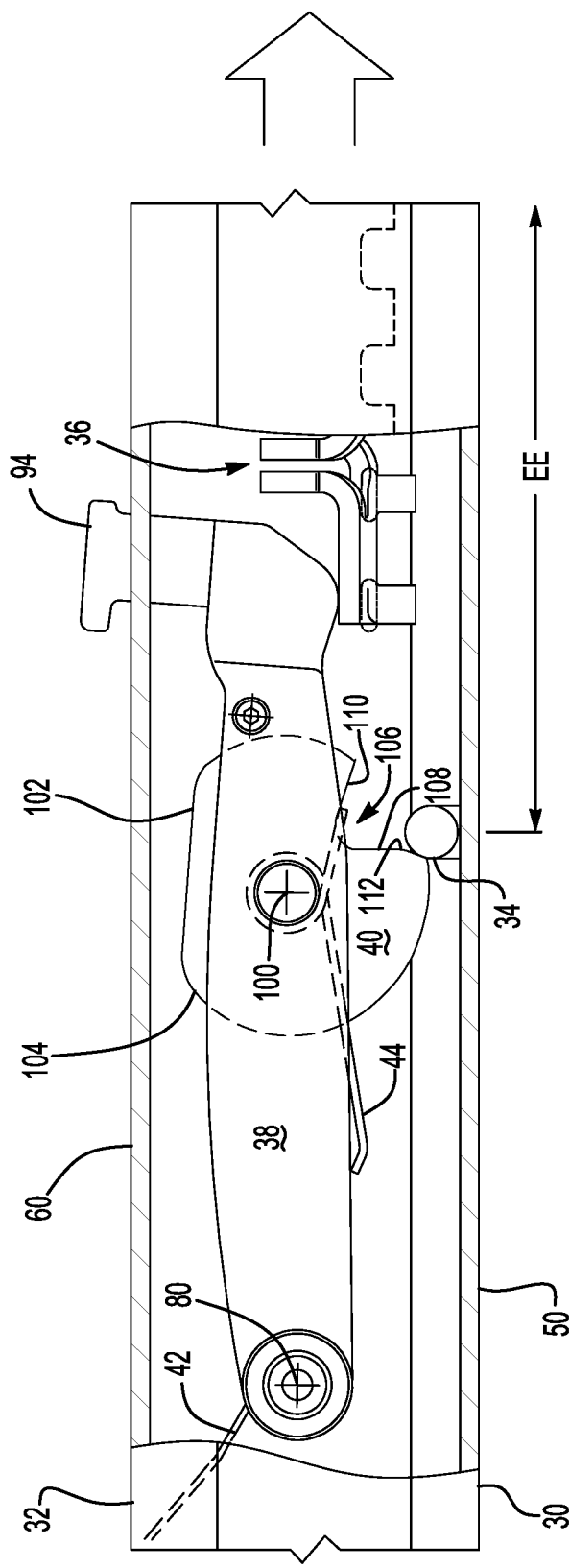
FIG. 5 is a fragmentary section view of the seat track mechanism showing the lever in a second position, the pawl in the unlocked position and in contact with a striker, and an upper track of the seat track mechanism moved to the right with respect to a lower track of the seat track mechanism.

Referring to FIG. 5, the upper track 32 is moved along the longitudinal axis 24 with respect to the lower track 30 such that the pawl 40 contacts the striker 34. More specifically, the upper track 32 is moved to the right with respect to the lower track 30 from the perspective shown. The upper track 32 may move with respect to the lower track 30 in response to an actuation force that may be exerted on the seat assembly 10. Such force may be exerted in any suitable manner, such as with a mechanical actuator like a spring, an electrical actuator like a motor, by manually sliding the seat assembly 10, or combinations thereof. The track latching mechanism 36, lever 38, pawl 40, lever biasing member 42, and pawl biasing member 44 may move with the upper track 32 since these components are directly or indirectly mounted to the upper track 32. In FIG. 5, the lever 38 is still shown in the second position and the pawl 40 is still shown in the unlocked position; however, the striker 34 is shown in engagement with the first recess surface 108. The striker 34 may engage or contact the first recess surface 108 below the apex 112.

Figure 6:
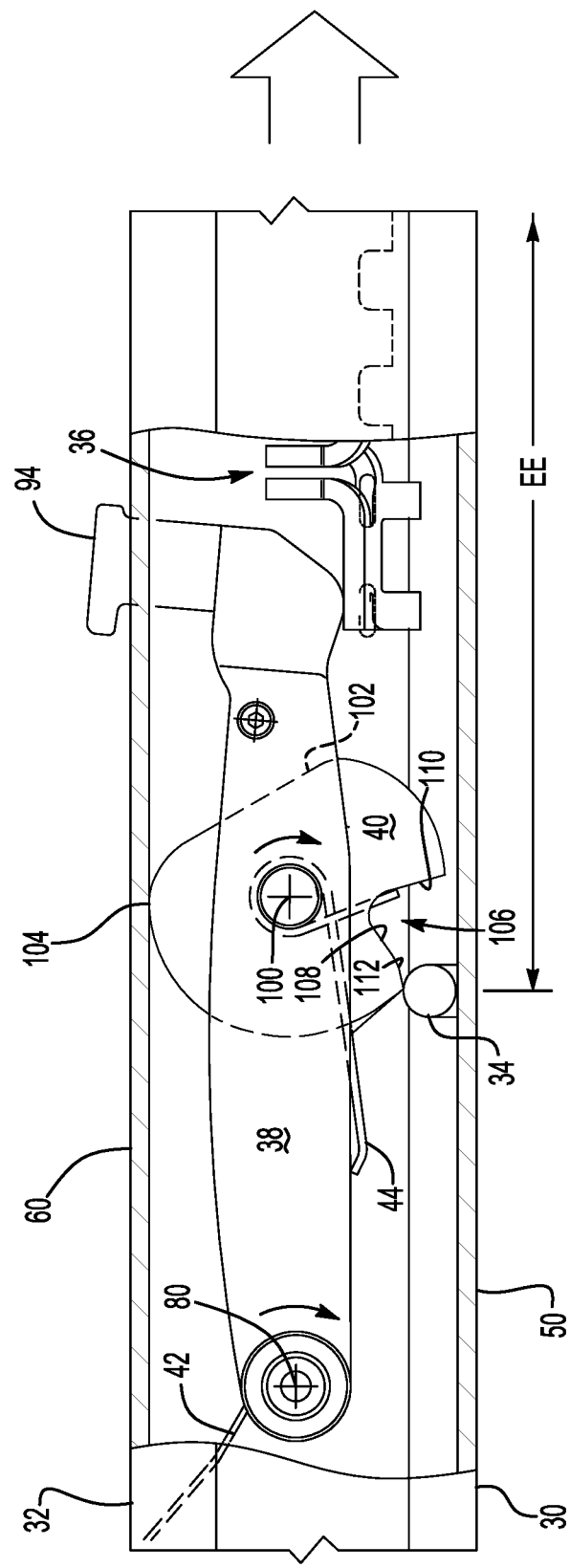
FIG. 6 is a fragmentary section view of the seat track mechanism showing the lever in a third position, the pawl in a locked position, and the upper track moved further to the right with respect to the lower track.

Referring to FIG. 6, the striker 34 may contact the first recess surface 108 to rotate the pawl 40 about the pawl axis 100 from the unlocked position to the locked position. More specifically, the upper track 32 is moved further to the right along the longitudinal axis 24 with respect to the lower track 30. Further movement of the upper track 32 to the right pushes the pawl 40 against the striker 34 and exerts sufficient force to overcome the biasing force exerted by the pawl biasing member 44, thereby causing the pawl 40 to rotate in a clockwise direction about the pawl axis 100 from the perspective shown to a locked position. Rotation of the pawl 40 to the locked position may move the cam lobe 104 upward and into engagement with the top wall 60 of the upper track 32 such that the cam lobe 104 may wedge against the top wall 60, thereby limiting or stopping rotation of the pawl 40. In addition, rotation of the pawl 40 to the locked position may rotate the lever 38 about the lever axis 80 from the second position to a third position, or in a clockwise direction about the lever axis 80 from the perspective shown. Accordingly, the pawl 40 may actuate the lever 38 from the second position to the third position when the striker 34 contacts the pawl 40 and the pawl 40 rotates about pawl axis 100 from the unlocked position to the locked position. As is best shown by comparing FIGS. 5 and 6, the pawl axis 100 may be disposed closer to the bottom wall 50 of the lower track 30 when the lever 38 is in the third position as compared to the second position. The striker 34 may slide along the first recess surface 108 away from the apex 112 and the pawl 40 may slide over the top of the striker 34 when the pawl 40 is wedged and the lever 38 is moved to the third position. The first recess surface 108 and the second recess surface 110 may face toward the bottom wall 50 of the lower track 30 when the pawl 40 is in the locked position. The lever 38 may continue to hold the latch plate 70 in the unlatched position. Accordingly, the upper track 32 may be slidable with respect to the lower track 30 along the longitudinal axis 24 when the lever 38 is in the third position.

Figure 7:
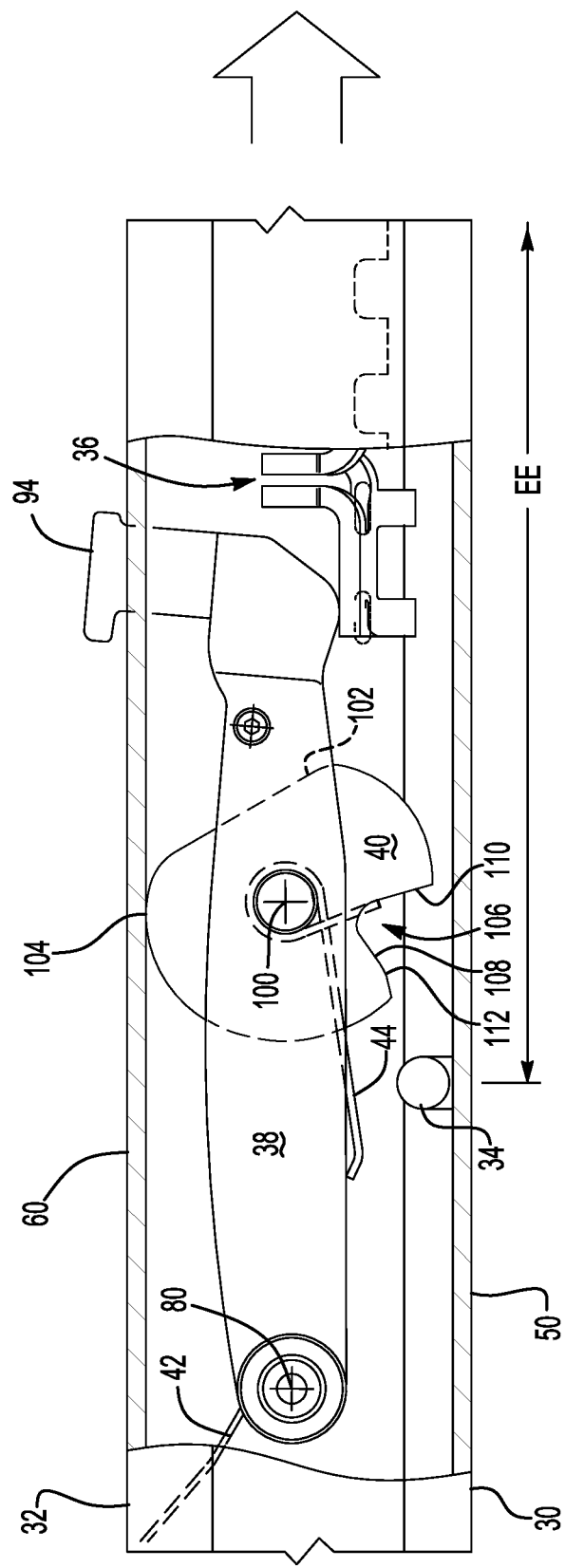
FIG. 7 is a fragmentary section view of the seat track mechanism showing the lever in the third position, the pawl in the locked position, and the upper track moved further to the right with respect to the lower track.

Referring to FIG. 7, the upper track 32 is moved further to the right along the longitudinal axis 24 with respect to the lower track 30 into an easy entry travel range EE. The upper track 32 may be freely movable with respect to the lower track 30 throughout the easy entry travel range EE. Accordingly, actuating the release handle may allow the seat back 12 to pivot forward and allow the seat back 12, seat bottom 14, and upper track 32 to move together in a forward direction along the longitudinal axis 24 to increase the amount of space available behind the seat assembly 10 to make it easier for passengers to enter or exit the vehicle. The pawl 40 remains in the locked position and prevents the lever 38 from rotating back to the first position or the second position.

Figure 8:
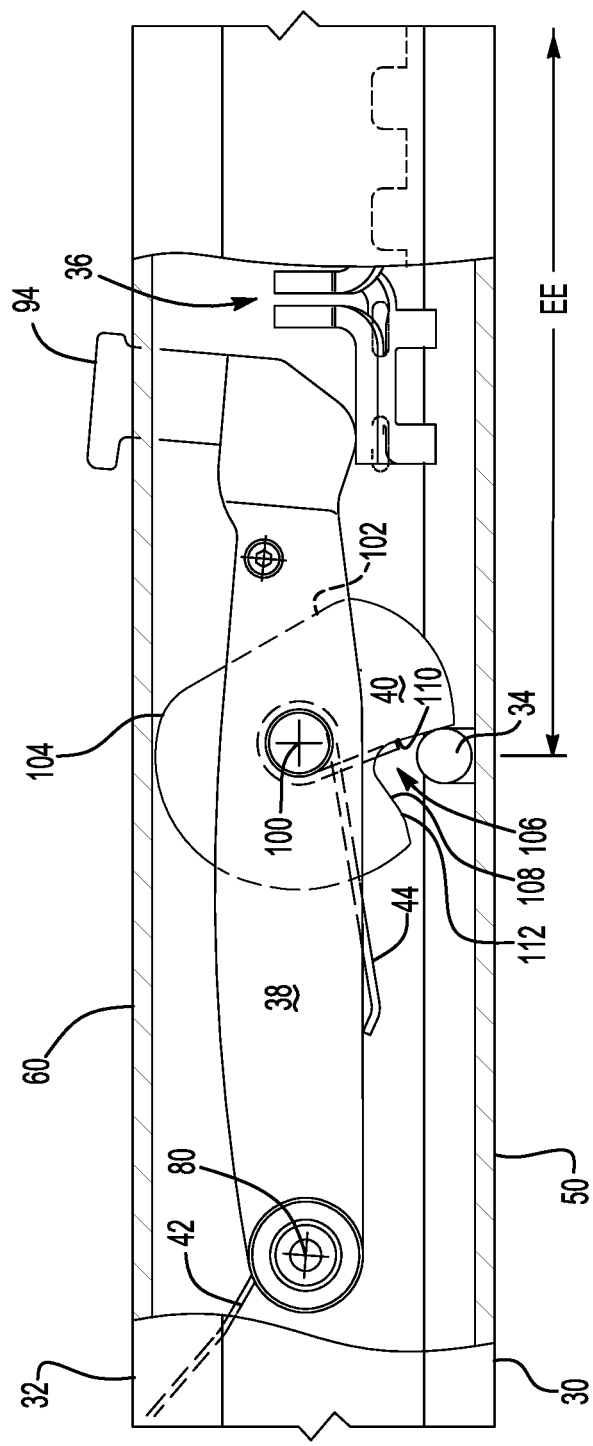
FIG. 8 is a fragmentary section view of the seat track mechanism showing the lever in the third position, the pawl in the locked position and in contact with the striker, and the upper track moved to the left with respect to the lower track.

Referring to FIG. 8, the start of a reverse actuation sequence is shown. The upper track 32 is moved to the left along the longitudinal axis 24 with respect to the lower track 30 while the lever 38 remains in the third position. The striker 34 may be engageable with the pawl 40 when the lever 38 is in the third position. Movement of the upper track 32 to the left pushes the second recess surface 110 of the pawl 40 against the striker 34 to initiate rotation of the pawl 40 about the pawl axis 100 from the locked position toward the unlocked position.

Figure 9:
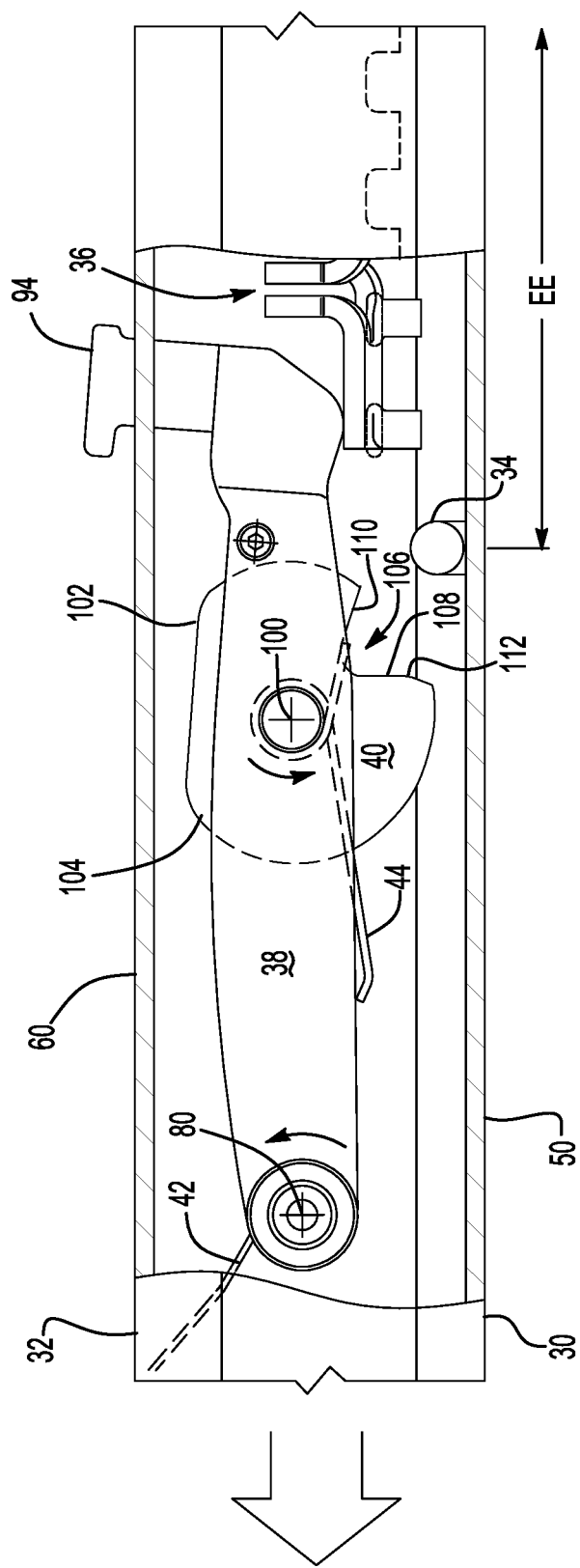
FIG. 9 is a fragmentary section view of the seat track mechanism showing the lever in the second position, the pawl in the unlocked position, and the upper track moved to the left with respect to the lower track.

Referring to FIG. 9, the upper track 32 is moved further to the left along the longitudinal axis 24 with respect to the lower track 30. Movement of the upper track 32 to the left overcomes the wedging force exerted between the cam lobe 104 and the upper track 32, thereby causing the pawl 40 to rotate in a counterclockwise direction about the pawl axis 100 from the perspective shown and therefore rotate back to the unlatched position. The pawl biasing member 44 also urges the pawl 40 to rotate about the pawl axis 100 with respect to the lever 38 back to the unlatched position. Releasing the cam lobe 104 from the upper track 32 permits the lever 38 to rotate in a counterclockwise direction about the lever axis 80 from the third position to the second position when sufficient downward force is not exerted on the actuation feature 94. The pawl axis 100 may be disposed further from the bottom wall 50 of the lower track 30 than the lever axis 80 when the lever 38 is in the first position and the second position.

From the position shown in FIG. 9, the lever 38 and the pawl 40 may then be free to return to the position shown in FIG. 3. For example, the lever 38 may move from the second position shown in FIG. 9 back to the first position shown in FIG. 3, the first surface 102 of the pawl 40 may reengage the top wall 60 of the upper track 32, and the latch plate 70 may move back to the latched position to inhibit movement of the upper track 32 with respect to the lower track 30 when sufficient downward force is not exerted on the actuation feature 94.

It is also noted that in FIGS. 3-9 the region to the left of the striker 34 and to the left of the easy entry (EE) region may designate a comfort travel region in which the seat bottom 14 may be selectively moved along the longitudinal axis 24 to a desired seating position by a seat occupant without executing easy entry functionality that keeps the latch plate 70 in the unlatched position until the seat bottom 14 returns to the position at which easy entry travel was initiated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat track mechanism comprising:
   a lower track;
   an upper track that is slidable with respect to the lower track;
   a striker that is received in the lower track;
   a lever that is received in the upper track and is rotatable about a lever axis with respect to the upper track; and
   a pawl that is received in the upper track and is rotatable about a pawl axis with respect to the lever, wherein the pawl rotates about the pawl axis when the striker engages the pawl, the lever is rotatable between a first position in which the upper track is not slidable with respect to the lower track, a second position in which the upper track is slidable with respect to the lower track, and a third position in which the upper track is slidable with respect to the lower track, and the pawl axis is disposed closer to a bottom wall of the lower track when the lever is in the second position as compared to the first position.

2. The seat track mechanism of claim 1 wherein the lever has a first arm and a second arm that are spaced apart from each other and the pawl is received between the first arm and the second arm.

3. The seat track mechanism of claim 1 wherein the striker does not engage the pawl when the lever is in the first position.

4. The seat track mechanism of claim 1 wherein the pawl axis is disposed closer to the bottom wall when the lever is in the third position as compared to the second position.

5. The seat track mechanism of claim 1 wherein the pawl axis is disposed further from the bottom wall than the lever axis when the lever is in the first position and the second position.

6. The seat track mechanism of claim 1 wherein the striker is engageable with the pawl when the lever is in the second position or the third position.

7. The seat track mechanism of claim 1 wherein the pawl actuates the lever from the second position to the third position.

8. The seat track mechanism of claim 1 wherein the pawl actuates the lever from the second position to the third position when the striker contacts the pawl and the pawl rotates about the pawl axis from an unlocked position to a locked position in which the pawl is wedged against the upper track.

9. The seat track mechanism of claim 8 wherein the upper track has a top wall and the pawl wedges against the top wall inside the upper track when in the locked position.

10. The seat track mechanism of claim 9 wherein the pawl has a first surface that is substantially planar that is aligned with and engages the top wall of the upper track when the pawl is in the unlocked position and the lever is in the first position.

11. The seat track mechanism of claim 10 wherein the pawl has a recess that is defined by a first recess surface and a second recess surface that extends at an oblique angle from the first recess surface, wherein the striker contacts the first recess surface to rotate the pawl about the pawl axis from the unlocked position to the locked position and the striker contacts the second recess surface to rotate the pawl about the pawl axis from the locked position to the unlocked position.

12. The seat track mechanism of claim 11 wherein the pawl has a cam lobe that is disposed between the first surface and the first recess surface and the cam lobe is wedged against the top wall when the pawl is in the locked position.

13. The seat track mechanism of claim 12 wherein the recess is disposed on an opposite side of the pawl axis from the cam lobe and the first recess surface and the second recess surface face toward a bottom wall of the lower track when the pawl is in the locked position.

14. A seat track mechanism comprising:
   a lower track;
   an upper track that is slidable with respect to the lower track;
   a striker that is received in the lower track;

a lever that is received in the upper track and is rotatable about a lever axis with respect to the upper track; and a pawl that is received in the upper track and is rotatable about a pawl axis with respect to the lever, wherein the pawl rotates about the pawl axis when the striker engages the pawl, the lever is rotatable between a first position in which the upper track is not slidable with respect to the lower track, a second position in which the upper track is slidable with respect to the lower track, and a third position in which the upper track is slidable with respect to the lower track, and the striker does not engage the pawl when the lever is in the first position.

15. The seat track mechanism of claim 14 wherein the lever has a center portion and a first arm and a second arm that are spaced apart from each other and extend from the center portion, wherein the pawl is received between the first arm and the second arm.

16. A seat track mechanism comprising:
a lower track;
an upper track that is received in the lower track and is slidable along a longitudinal axis with respect to the lower track;
a striker that is fixedly disposed in the lower track;
a lever that is received in the upper track and is rotatable about a lever axis with respect to the upper track, wherein the lever has a center portion and a first arm and a second arm that are spaced apart from each other and extend from the center portion; and
a pawl that is received in the upper track, received in the lever between the first arm and the second arm, and is rotatable about a pawl axis with respect to the lever, wherein the pawl rotates about the pawl axis when the striker engages the pawl.

17. The seat track mechanism of claim 16 wherein the striker extends from the lower track into the upper track.

18. The seat track mechanism of claim 16 wherein the lower track has a bottom wall that is disposed below the upper track and the striker extends from the bottom wall.

19. The seat track mechanism of claim 16 wherein the pawl is rotatably disposed on the first arm and the second arm.

20. The seat track mechanism of claim 16 wherein the lever has an actuation feature that extends from the first arm and the second arm and through the upper track, wherein the pawl axis is positioned closer to the actuation feature than to the lever axis.

* * * * *